United States Patent
Candelaria et al.

(10) Patent No.: US 10,402,123 B2
(45) Date of Patent: Sep. 3, 2019

(54) SHARING ALIAS ADDRESSES AMONG LOGICAL DEVICES

(71) Applicant: INTERNATIONAL BUSINESS MACHINES CORPORATION, Armonk, NY (US)

(72) Inventors: Susan K. Candelaria, Tucson, AZ (US); Scott B. Compton, Hyde Park, NY (US); Matthew R. Craig, Sahuarita, AZ (US); Clint A. Hardy, Tucson, AZ (US); Matthew J. Kalos, Tucson, AZ (US); Dale F. Riedy, Poughkeepsie, NY (US); Richard A. Ripberger, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 15/176,011

(22) Filed: Jun. 7, 2016

(65) Prior Publication Data
US 2017/0351443 A1 Dec. 7, 2017

(51) Int. Cl.
*G06F 12/00* (2006.01)
*G06F 3/06* (2006.01)

(52) U.S. Cl.
CPC ............ *G06F 3/067* (2013.01); *G06F 3/0607* (2013.01); *G06F 3/0665* (2013.01); *G06F 3/0689* (2013.01)

(58) Field of Classification Search
CPC ...... G06F 13/00; G06F 3/0607; G06F 3/0665; G06F 3/0689

USPC ............ 710/3–7, 36–45, 20–21; 711/2, 112, 711/200–201
See application file for complete search history.

(56) References Cited

U.S. PATENT DOCUMENTS

| 7,702,879 B2 | 4/2010 | Yudenfriend et al. |
| 8,230,435 B2 | 7/2012 | Brice, Jr. |

(Continued)

OTHER PUBLICATIONS

U.S. Appl. No. 15/176,021, filed Jun. 7, 2016.

(Continued)

*Primary Examiner* — Tim T Vo
*Assistant Examiner* — Kim T Huynh
(74) *Attorney, Agent, or Firm* — David W. Victor; Konrad Raynes Davda & Victor LLP

(57) ABSTRACT

Provided are a computer program product, system, and method for sharing alias addresses among logical devices for a control unit managing access by hosts to logical devices configured with capacity from attached physical devices. An alias management group of logical devices and alias addresses assigned to the logical devices is configured. A plurality of requests to establish an association of the host with a logical device and the alias addresses assigned to the logical devices in the alias management group are received from a host. Acknowledgment is made to the host that the association is established in response to determining that the host is assigned the logical devices and alias addresses of the logical devices in the alias management group. The host can use one available alias address assigned to any one of the logical devices to access any one of the logical devices indicated in the association.

25 Claims, 10 Drawing Sheets

(56) References Cited

U.S. PATENT DOCUMENTS

2004/0010682 A1* 1/2004 Foster et al. ............ H04L 29/06
713/156
2007/0136552 A1* 6/2007 Yudenfriend et al. ......................
G06F 12/00
711/201
2012/0096236 A1 4/2012 Aranguren et al.

OTHER PUBLICATIONS

List of IBM Patents or Patent Applications Treated as Related dated Jun. 7, 2016, pp. 2.
Office Action dated Mar. 15, 2018, pp. 12, for U.S. Appl. No. 15/176,021, filed Jun. 7, 2016.
Response to Office Action dated Jun. 15, 2018, pp. 11, for U.S. Appl. No. 15/176,021, filed Jun. 7, 2016.
Notice of Allowance dated Mar. 8, 2019, pp. 7, for U.S. Appl. No. 15/176,021.

* cited by examiner

Host/Processing System UCB Info

Control Unit Address Information

Processing System Alias Address Pool Information

Alias Management Group

Path Group Control Block

Alias-Base Relationship-Authorization Information

SHARING ALIAS ADDRESSES AMONG LOGICAL DEVICES

BACKGROUND OF THE INVENTION

1. Field of the Invention

The present invention relates to a computer program product, system, and method for sharing alias addresses among logical devices.

2. Description of the Related Art

In certain computing environments, multiple host systems may communicate with multiple control units (CUs) (also known as storage controllers, storage subsystems, enterprise storage servers, etc.) through one or more logical paths providing access to interconnected storage devices, such as hard disk drives or solid state storage drives (SSDs). The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS may be configured to include multiple volumes.

The host system may include a channel subsystem that maintains information to access logical volumes in the control unit. The channel subsystem includes subchannels, which provides state tracking for the execution of the I/O operations issued to a logical volume and provides information on the logical paths connecting the channel subsystem to the control unit and on the unit address of the logical volume on each logical path. The host operating system maintains a unit control block (UCB) providing information on the logical volume and the subchannel number that the channel subsystem uses to access the logical volume. When a control unit supports alias addressing, the unit address on a logical path associated with a logical volume is referred to as a base address. Other unit addresses on a logical path may be configured that are referred to as alias addresses and may be used as an alternate unit address to issue an I/O request to a logical volume. The host operating system can distinguish which unit address are base address and which are alias addresses by self-description information provided to I/O requests issued to the unit address.

In a static implementation, the customer may initially assign aliases to bases via external tools to the control unit and the aliases are used for I/O requests directed to the bases to which they are assigned. A static implementation may also provide a way for a customer or the host operating system to reassign an alias to a new base. When reassignment is performed, the alias provides notification to the host program that it has changed its base assignment. In another implementation, the alias addresses do not have a fixed affinity to a particular base address, and the base address is selected through a command at the beginning of an I/O request. In these implementations, the base addresses that can be selected through the alias address are limited to bases on the same logical subsystem (LSS, also known as control unit image) on the control unit. This allows one alias address to have I/O operations (from different hosts) in progress concurrently.

The host processes the information in the UCB to address an I/O operation to a logical volume. In particular, the host initiates an I/O operation toward a logical volume by initiating a channel program which consists of a series of channel command words (CCWs), each of which may contain a command to be issued to the logical volume.

A base unit address is associated with a logical volume when it is configured on the control unit. After assigning a base address to each logical volume (device), the remaining addresses can be allocated as alias addresses. Depending on the implementation, either the alias has an associated base (static implementation), or the alias has some scope of bases that can be selected by a command issued at the beginning of an I/O operation. The control unit associates a given I/O request issued to a base address or an alias address with one and only one logical volume.

One or more I/O operations can be simultaneously issued to the same logical volume using the base address and one or more alias unit addresses for the logical volume. In this way, the issued I/O requests are all directed to the same logical volume using different addresses, wherein each address may be accessed by the channel subsystem through one or more logical paths. This allows a single host to concurrently execute multiple I/O operations against a single volume. In a static implementation, the number of aliases provided for a base may be set according to the expected or measured number of concurrent I/O requests for the logical volume. In certain cases, only a few aliases may be needed to accommodate network, e.g., Storage Area Network (SAN), traffic for a particular logical volume.

In a dynamic implementation, the number of aliases provided for a set of bases that can be selected through the set of aliases can be set according to the number of concurrent I/O requests for the set of logical volumes. Since the aliases can be dynamically assigned on a per I/O basis, the average number of aliases per volumes is generally significantly less than for static alias assignments.

The host operating system is aware of which subchannels are associated with a base address and which subchannels are associated with an alias addresses. It is also aware of which alias addresses can be used to issue I/O requests to which logical volumes. And it is also aware whether an alias address is static or dynamic. When the alias address is dynamic, the host operating system preprocesses any I/O request by prefixing an appropriate command to the channel program to select the logical volume that the I/O request is being issued to. When the host operating system receives an I/O request for a logical volume, the host program selects one of the subchannels that can be used for the logical volume to issue the I/O request. The host program may use one or more algorithms to select the applicable subchannel. For example, it might use a round robin selection scheme that skips subchannels that are already busy with existing I/O operations. If no subchannels are available, the host operating system queues the I/O request for the logical volume until a subchannel becomes available. Once the I/O operation is issued to the subchannel, the channel subsystem selects a logical path associated with the subchannel to issue the I/O request to the unit address on the control unit associated with the subchannel. Once the I/O request has ended at the logical volume, the control unit presents status to the channel subsystem and the subchannel provides the host program with information describing the completion status of the I/O request.

SUMMARY

Provided are a computer program product, system, and method for sharing alias addresses among logical devices for a control unit managing access by hosts to logical devices configured with capacity from attached physical devices. An alias management group of logical devices and alias addresses assigned to the logical devices is configured for use to access the logical devices. A plurality of requests to establish an association of the host with a logical device and the alias addresses assigned to the logical devices in the alias management group are received from a host. Acknowledgment is made to the host that the association is established in response to determining that the host is assigned the logical devices and alias addresses of the logical devices in the alias management group, wherein the host can use one available alias address assigned to any one of the logical devices indicated in the association to access any one of the logical devices indicated in the association.

With the described embodiments, a host may obtain an alias address to use for a request to a logical device that is associated with a different logical device. In this way, alias addresses remaining unused for one logical device may be made available to access a different logical device to provide a mechanism for efficiently using alias addresses. Described embodiments accomplish this sharing of alias addresses among logical devices, which may comprise logical volumes configured in logical subsystems, by creating an alias management group associating the logical devices and their alias addresses for sharing.

In a further embodiment, the alias management group consists of a set of logical device and a set of alias addresses in which two or more hosts have access to one or more alias addresses in common and where two or more hosts have access to a set of logical volumes such that each host shares the common alias addresses to only access logical volumes that they are configured to access.

By associating hosts with subsets of logical devices and alias addresses in the alias management group, the assignment of which alias addresses a particular host may use may be defined so that different subsets of the alias addresses in logical volumes in an alias management group can be assigned to different hosts to provide control over how a host may share alias addresses for the logical devices the host can access.

In a further embodiment, checking is performed during a host access to a logical volume through an alias address. The control unit allows host access if the host has authority to access the logical volume as determined by verifying that the association established by the host and channel with the alias volume has matching credentials in an association for this host with the base address of the logical volume.

The control unit upon receiving a host access using an alias address verifies the host access using other information and credentials that associate the host with the base address to the logical volume being accessed through the alias address to independently verify the host may access the logical device addressed by the alias address.

In a further embodiment, the requests from the host to establish an association with a logical volume or alias address comprise path group establish requests. Each path group establish request is to establish a path group including a path group identifier unique to the host for which the path group is provided. Each of the path groups is associated with one of the logical devices or alias addresses used to access the logical device from the alias management group, and wherein different path groups with a same unique path group identifier are used to determine that the host has access to both the logical devices and the alias devices.

By the control unit creating an alias management group, the host may then issue requests to multiple path group control blocks for logical paths having the path group identifier unique to the host. This path group identifier unique to the host associates path groups having logical devices and alias addresses from an alias management group that may be shared. In this way, the host may define a path group identifier unique to the host that associates path groups, and the control unit may maintain alias-base relationship-authorization information to provide the association of alias addresses and logical devices from the alias management group that may be shared.

DETAILED DESCRIPTION

In prior art systems that assign alias addresses to logical subsystems for use to direct I/O requests to logical volumes in the logical subsystems, hosts are limited to using alias addresses within the same logical subsystem as the base address. Described embodiments provide techniques for a control unit and hosts to extend the set of base address that can be accessed through an alias beyond the limitations of a single logical subsystem. To allow this operation, an alias management group consisting of a set of logical subsystems is defined in which any alias address on any logical subsystem associated the alias management group can be used to issue an I/O request to any base address on any logical subsystem associated with the alias management group. The control unit might have a single alias management group containing all logical subsystems on the control unit, or the control unit might have multiple alias management groups, with a given logical subsystem being associated with one and only one alias management group.

Figure 1:
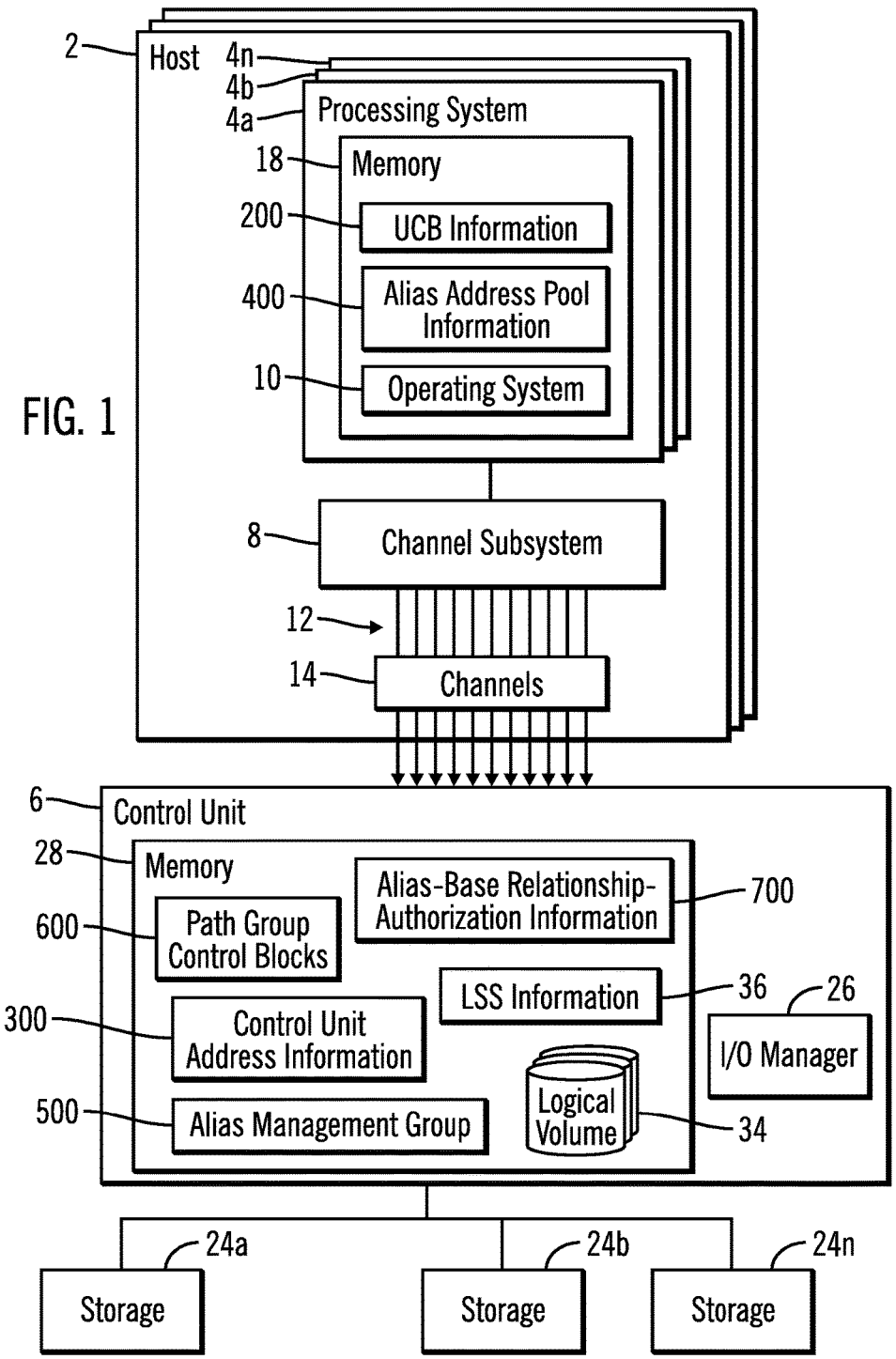
FIG. 1 illustrates an embodiment of a computing environment.

FIG. 1 illustrates an embodiment of a computing environment. One or more hosts 2 (only one is shown) include one or more processing systems 4a, 4b . . . 4n that communicate Input/Output (I/O) requests to a control unit 6 through a channel subsystem 8 that connects through a plurality of logical paths to the control unit 6. Each processing system 4a, 4b . . . 4n includes a memory 18 executing an operating system 10 to manage path related operations. The channel subsystem 8 manages logical paths 12 which are accessed through channels 14. A channel 14 provides the physical layer through which logical paths 12 extend to the control unit 6 or multiple control units through a switch (not shown). The operating system 10 may further associate multiple logical paths 12 with a path group such that the channel subsystem 8 may select which of the logical paths in the path group are used to communicate with the control unit 6. Path groups used by one operating system 10 may be identified by a unique path group identifier (PGID). The operating system 10 may issue an I/O command (such as a Set Path Group ID CCW) to each logical path to the device using a world wide unique identifier (PGID), or the PGID is just unique in an enterprise or among all hosts that connect to the control unit 6. The control unit 6 creates a path group from the set of logical paths for a device that have the same PGID identifier. Each device has a unique unit address on each logical path, where the device may comprise a logical volume or an alias address.

In one embodiment, the channel subsystem 8 may be implemented as firmware or microcode. The channel subsystem 8 may be implemented in dedicated hardware comprising a separate set of integrated circuit chips.

Each processing system 4a, 4b . . . 4n may comprise a physical machine or a virtual machine, such as a logical partition (LPAR), to which computer resources, such as one or more central processing units (CPU) and memory resources are assigned. Each processing system 4a, 4b . . . 4n may execute their own operating system 10, device drivers, and may execute channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 16 or different processing systems 4a, 4b . . . 4n may use different logical channel subsystems.

The channel subsystem 8 performs the operations to communicate I/O requests from the processing systems 4a, 4b . . . 4n to the control unit 6. The operating system 10 uses UCBs and manages I/O requests. The channel subsystem 8 obtains the I/O request from the operating system 10. The memory 18, comprised of one or more memory devices, includes information used by the channel subsystem 8 and operating system 10 to manage I/O requests. Each processing system 4a, 4b . . . 4n maintains its own UCB 200 and alias address pool information 400 providing information on the devices accessible by each processing system 4a, 4b . . . 4n. Different processing systems 4a, 4b . . . 4n may have different UCB and alias address pool information having different alias addresses assigned to the base addresses for a particular processing system.

The memory 18 further includes alias address pool information 400 providing information on the assignment of available alias addresses for different logical subsystems (LSS) 36 for the processing systems 4a, 4b . . . 4n, such that different processing systems 4a, 4b . . . 4n may use the same alias address for different base addresses. The control unit 6 maintains information on logical subsystems 36 and logical volumes 34 configured from capacity of the physical storage devices 24a, 24b . . . 24n. Further, different processing systems 4a, 4b . . . 4n may use the same alias address for different base addresses, to assign the aliases in different configurations to the volumes and alias address pool. In one embodiment, the memory 18 may maintain the UCB information 200 and alias address pool information 400 for all processing systems 4a, 4b . . . 4n in the host 2, which is shared for all processing system operations at the same time. In a further embodiment, each processing system may maintain in its own memory the UCB information 200 and alias address pool information 400 for that processing system 4a, 4b . . . 4n. In one embodiment, there is a separate host memory 18 local to each processing system 4a, 4b . . . 4n operating system image.

The control unit 6 memory 28 maintains a relationship of base addresses and alias addresses to logical subsystems, base addresses to logical volumes, and of static alias addresses to base addresses in control unit address information 300. The channel subsystem 8 or channel subsystem image is configured to define the devices that are accessible through the channel subsystem. The host operating system 10 communicates with the accessible devices to discover the relationships of subchannels to logical volumes or alias addresses and stores information in the UCB information 200 or alias address pool information 400. As such, both the control unit 6 and the host operating system 10 have a synchronized view of the relationships between base address, alias addresses, and logical subsystems 36. In the case of static alias addresses, at any time, there is a one to one relationship between an alias address and a base address. In the case of dynamic aliases, there is a one to one relationship between a set of aliases and a set of base addresses such that any member of the first set can be used for any member of the second set.

The control unit 6 manages I/O requests from the processing systems 4a, 4b . . . 4n to access data units, such as logical tracks, CKD records, or CKD record fields (count, key, and/or data). The control unit creates a mapping from each logical track of a logical volume to a physical track on a storage system 24a, 24b . . . 24n when the logical volume is created. The storage system 24a, 24b . . . 24n is comprised of one or more SCSI storage devices, such as hard disk drives or solid state disks, and the physical tracks are comprised on a number of logical blocks on the storage devices. The control unit 6 includes an I/O manager program 26 to process I/O requests to the logical volumes 34 and logical components configured therein, e.g., logical tracks, etc. The control unit 6 has a control unit memory 28, comprised of one or more memory devices, in which the I/O manager 26 maintains control unit address information 300 having the assignment of base and alias addresses within a logical subsystem (LSS). The memory 28 further includes one or more alias management groups 500 associating a set of LSSs 36 that contain a set of zero or more alias addresses, a set of one or more base addresses such that an alias in the first set can be used to issue an I/O request to a base address in the second set and path group control blocks (PGCB) 600 providing information on a path group of logical paths used by a processing system 4a, 4b . . . 4n.

A PGCB is created by the I/O manager 26 when the processing system 4a, 4b . . . 4n establishes a path group with the control unit 6, where the established path group comprises logical paths the processing system 4a, 4b . . . 4n uses to communicate with the logical volumes 34 and alias addresses on a logical subsystem 36 (or, in host terms, the devices on a control unit image), and submit I/O requests and receive responses to the submitted I/O requests. The processing system 4a, 4b . . . 4n and control unit 6 may select any logical path in the path group established for the logical volume to communicate requests, information and alerts. To ensure that the processing system that has access to an alias address has authority to issue I/O requests to a selected base address, the control unit validates the following information about logical path issuing the I/O request to an alias: (1) The logical path is in the grouped logical path state on the alias (i.e. it is online to that host), (2) the path group ID (PGID) established by the host issuing the I/O request on the logical path matches one of the PGIDs established on the base address, (3) the world wide node name (WWNN) of the issuing host (from Read Node Identifier link control frame) associated with the channel on the issuing logical path matches the WWNN of the host associated with the matching PGID on the base address, and (4) the source fabric/link address of the issuing logical path matches the source/link address of one of the logical paths in the matching PGID on the base address. If these conditions are not met, the control unit rejects the I/O request. The memory 28 further maintains alias-base relationship-authorization information 700 that associates multiple path groups for a host 2 and logical subsystem to provide the alias addresses for different LSSs 36 that may be shared to access the logical volumes on the LSSs. The operating system is responsible for partitioning the base and aliases in the alias management group obtained from the control unit if more than one set of channels are used to create path groups to each base and alias address in the alias management group. This alias-base relationship-authorization information is used internally to the control unit to efficiently implement the previously described authority checking.

The hosts 2 may comprise computational devices known in the art, such as a workstation, mainframe, server, etc. The control unit 6 may comprise a storage subsystem or server, such as an enterprise storage server, storage controller, etc., or other device used to manage I/O requests to attached volumes. The storages 24a, 24b . . . 24n may comprise storage devices known in the art, such as such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 18 and 28 may comprise a suitable volatile or non-volatile memory devices, including those described above.

Figure 2:
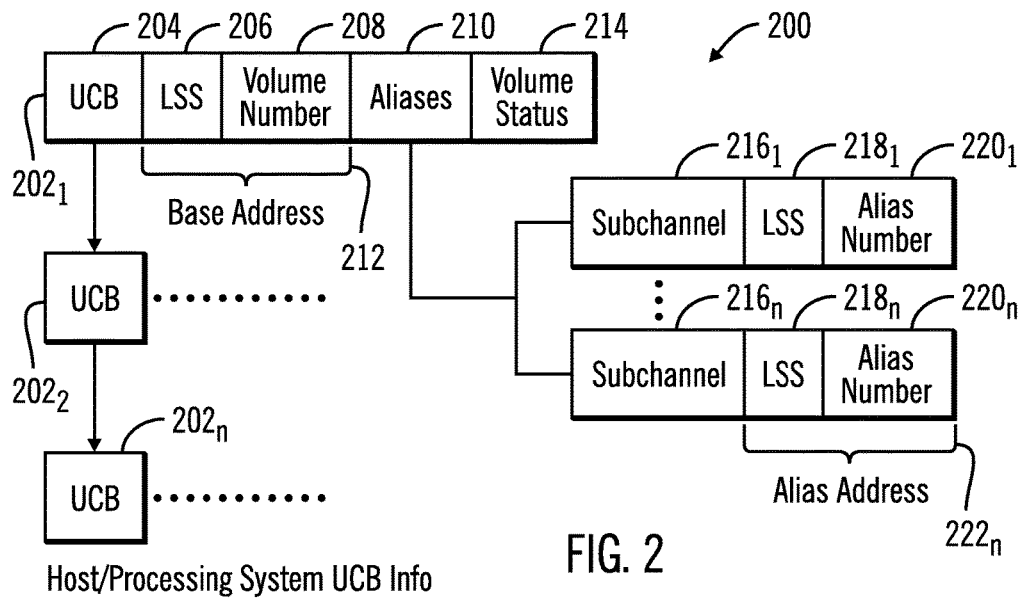
FIGS. 2 and 4 illustrate embodiments of information a host maintains to access volumes using alias addresses.

FIG. 2 illustrates host/processing system UCB information 200 having information on the assignment of base and alias addresses to the logical volumes for one processing system 4a, 4b . . . 4n and LSS 36. An instance of the information 200 would be maintained for each separate processing system 4a, 4b . . . 4n and LSS 36 pair in the host 2. The instances of the UCB information 200 comprise the UCB information 200. The information 200 includes UCB entries $202_1$, $202_2$ . . . $202_n$ for one processing system 4a, 4b . . . 4n, which includes for each UCB $202_1$, $202_2$ . . . $202_n$ in the chain the following information: a UCB identifier 204 of a UCB providing information to access one logical volume configured on the control unit with capacity provisioned from the storage devices 24a, 24b . . . 24; a base address 212 for the logical volume that is composed of a logical subsystem number (LSS) 206 identifying the logical subsystem that the logical volume is configured on, and a volume number 208 identifying the address of the logical volume within the logical subsystem 206; a list of zero or more alias address 210 that are assigned to the base address 212 and are each composed of a subchannel 216, of the channel subsystem 14 comprising a subchannel number and an alias address that is composed of a logical subsystem number (LSS) $218_i$ identifying the logical subsystem the alias address is configured on, and an alias number $220_i$ identifying the address of the alias address within the logical subsystem, where the LSS $218_i$ and an alias number $220_i$ may form an alias address $222_i$ (as shown for alias address $222_n$), and volume status 214 providing information on the status of the logical volume. In certain embodiments, alias addresses assigned to one or more LSS are only associated with a specific USCB $202_i$ when an I/O operation is active for that alias address. Otherwise the aliases reside in a pool 400 of available aliases not associated with any specific base (USB $202_i$). In certain embodiments, from the host perspective, only one I/O can go through a subchannel (alias) at a time so when the subchannel is busy with the I/O the subchannel cannot be used for other volumes. On the control unit, different host may use the alias concurrently for different bases.

In one embodiment, alias addresses may be initially associated with bases in the logical subsystem (LSS) of the control unit 6. If the storage subsystem and the operating system 10 supports dynamic aliasing, then the operating system 10 issues a "set subsystem characteristics command" to tell the logical subsystem 36 to operate in a mode where alias addresses in this logical subsystem are required to have a command issued at the beginning of an I/O request that selects the base address to which the I/O request is being issued. This selection overrides the static relationship to a base that exists for operating systems that have not issued a set subsystem characteristics command to enable dynamic aliases. This command causes the alias addresses to no longer be associated with a specific base address 212 for that processing system 4a, 4b . . . 4n. Each operating system in a processing system 4a, 4b . . . 4n can change their alias addressing modes independently. At this point, the alias addresses are available to be assigned to a UCB 202 as I/O operations are started, and returned to the pool as operations complete. In one embodiment, the control unit 6 provides a configuration control to the customer to enable or disable dynamic aliases. In this case the control unit 6 provides notification to all attached operating systems 10 when dynamic aliases are allowed or disallowed and the operating systems that support dynamic aliases dynamically modify their behavior to exploit the dynamic aliases or return to static aliases as required by the notification. In this way, the operating system may transition in and out of the mode where alias addresses are dynamically assigned and used to a mode where they are statically assigned and used.

In the illustrated embodiment of FIG. 2, the UCB information 200 provides a chain of UCBs $202_1$, $202_2$ . . . $202_n$ for one processing system 4a, 4b . . . 4n and one LSS 36 configured in the control unit 6, where each UCB $202_1$, $202_2$ . . . $202_n$ includes information for one logical volume. In alternative embodiments, the UCB information 200 may include different information for different storage systems and environments to provide information on base and alias addresses assigned to logical volumes configured in the control unit 6. Further, if the system is not implementing channel subsystem technology, then information on the subchannel, such as fields 210 and 216 may not be included.

Figure 3:
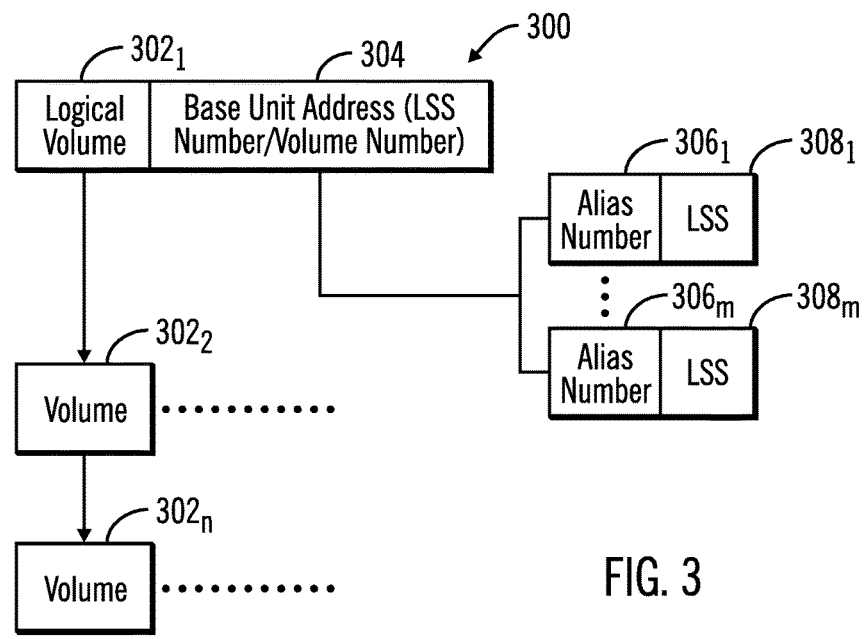
FIG. 3 illustrate embodiments of information a control unit maintains to allow a host to use alias addresses to access volumes managed by the control unit.

FIG. 3 illustrates an embodiment of control unit address information 300 having information on the assignment of base and alias addresses. The address information 300 includes an entry $302_1$, $302_2$ ... $302_n$ for each logical volume 34 configured in the logical subsystem (LSS) 36 for which the information 300 is maintained. Each entry includes: the volume identifier for the logical volume 34 which is its base address 304 consisting of LSS Number being the logical subsystem 36 that the logical volume 34 is configured on and a volume number being a unique identifier for the logical volume 34 within the logical subsystem 36; and zero or more alias addresses comprised of an alias number 306, and LSS $308_i$ to which the alias number $306_i$ is configured to additionally use to access the logical volume. The alias address to base address relationships in FIG. 3 may be used for I/O requests that are operating with static alias and the information is constrained in certain implementations such that the LSS Number of the base address must be the same as the LSS number of the alias address.

For I/O requests that use dynamic aliases, the information in FIG. 3 may be ignored. When an I/O request is issued to a dynamic alias, the operating system 10 prefixes a command to the I/O request that select the base address of the logical volume that the I/O is intended for. The control unit 6 is aware of a scope of base addresses that a dynamic alias is allowed to access and rejects an I/O request if this scope is exceeded. If the I/O request is accepted, the base address selected for the I/O request and the alias (or base) address to which the I/O request was issued are both stored in the I/O request information (FIG. 11) maintained by the control unit 6 for the duration of an I/O operation. In prior art embodiments, the scope of access by a dynamic alias address is limited to those base addresses on the same logical subsystem 36 as the alias address. In the current embodiment, the scope is limited to the bases addresses on logical subsystems 36 that are in the same alias management group (FIG. 5) as the logical subsystem 36 that the alias address is configured on.

Figure 4:
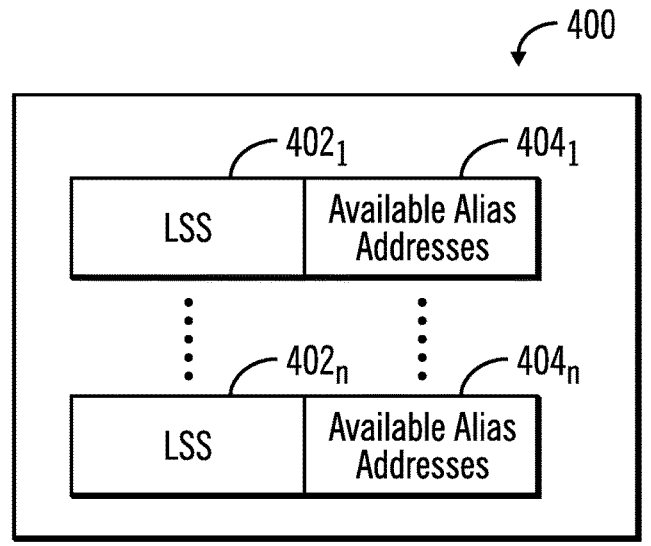

FIG. 4 illustrates an embodiment of processing system alias address pool information 400 maintained for one processing system 4a, 4b ... 4n associating a plurality of logical subsystems (LSSs) $402_1$ ... $402_n$ and the available alias addresses $404_1$ ... $404_n$ assigned to the LSSs $402_1$ ... $402_n$. In certain embodiments, any of the alias addresses $404_1$ ... $404_n$ assigned to any of the LSSs $402_1$ ... $402_n$ and associated in the alias address pool 400 may be used to access any of the LSS $402_1$ ... $402_n$ with the limitation that the logical subsystems are all in the same alias management group 500 and have the same channels in their path groups. In this way, the processing system is not limited to only using alias addresses assigned to the LSS the processing system is accessing, but instead, the processing system 4a, 4b ... 4n may use alias addresses assigned to other LSSs to access a logical volume base address on an LSS associated in the alias address pool. 400.

Figure 5:
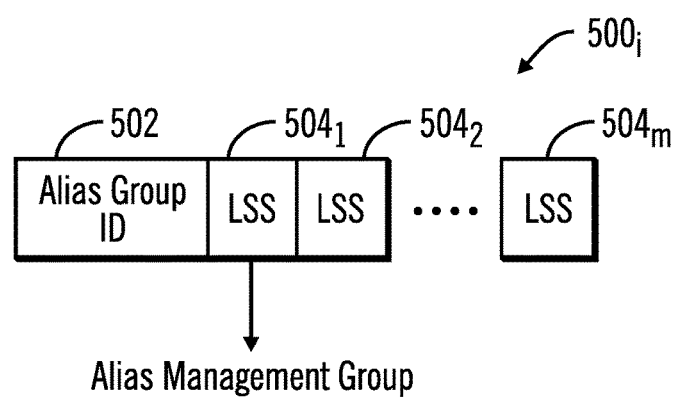
FIG. 5 illustrates an embodiment of an alias management group.

FIG. 5 illustrates an embodiment of an alias management group 500 having an alias group identifier (ID) 502 and one or more associated LSSs $504_1$ ... $504_m$. For I/O requests using dynamic aliases, any alias address configured on an LSS in the alias management group can be used to access any base address configured on an LSS in the alias management group. Multiple alias management groups $500_i$ may be configured in a control unit 6 to constrain the scope of access between alias addresses and base addresses. These constraints may be required by the control unit due to its design or may be desired to restrict access in multi-tenancy environments where different logical subsystems 36 might be assigned to different tenants such that the address management group prevents a tenant from using one of its aliases to access base volumes owned by another tenant. In this way, the alias addresses configured on LSSs in an alias management group 500 may be used to access base addresses on any of the LSSs in the alias management group 500.

Figure 6:
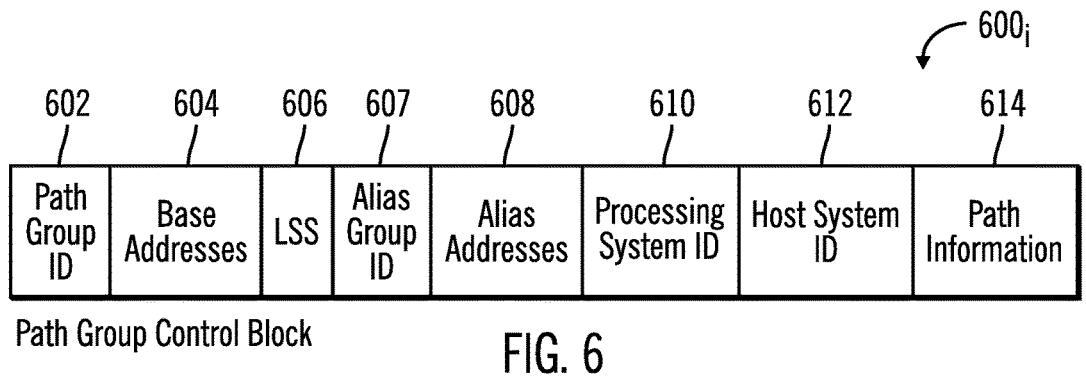
FIG. 6 illustrates an embodiment of a path group control block.

FIG. 6 illustrates an embodiment of an instance of a path group control block $600_i$ including information associated with a path group established for one processing system 4a, 4b ... 4n comprising logical paths used for communication between the processing system 4a, 4b ... 4n and a logical subsystem 36 (also referred to as a control unit image in host terminology). A path group control block $600_i$ includes a path group identifier (PGID) 602 identifying the path group; base addresses 604 of logical volumes 34 assigned to the path group; an alias group ID 607 identifying the alias management group $500_i$ with which the LSS 606 is associated; alias addresses 608 assigned to the path group; an LSS 606 that the path group is associated with and one which the base addresses and alias addresses in the path group are configured; a processing system identifier (ID) 610 for the processing system 4a, 4b ... 4n (such as a node descriptor) for which the path group was established; a host system identifier 612 of the host system 2 including the processing system 4a, 4b ... 4n assigned to the path group identified by the PGID 602; and path information 614 identifying logical paths, such as both ends of the connection, used to connect the host system 612 to the control unit 6 to which the host 612 connects to access the underlying storages logical volumes 34 and LSS 36.

In one embodiment, the processing system ID 610 and host system ID 612 are included by host 2 hardware in commands from a processing system 4a, 4b ... 4n sent to the control unit 6 to set a path group or submit I/O requests. For instance, the host channels 14 may send the processing system ID 610 and host system ID 612 to the control unit 6 ports when a logical connection is established. The control unit 6 may then bind the processing system ID 610 and host system ID 612 with the path group identifier 602 in a path group control block $600_i$. In certain embodiments, only a host 2 with legitimate permission to use a resource, e.g., logical volume, can establish a path group for the device, so it is the processing system ID 610 and host system ID 612 of a legitimate host that are bound to a path group, identified by a path group ID, for the device, e.g., logical volume identified by the base address.

In certain embodiments, there may be one base address value present in more than one instance of the path group control block $600_i$. This situation may occur if two processing systems 4a and 4b were each granted permission to access that base address. In such a case, the path group control block $600_i$ containing the processing system ID 610 and the host system ID 612 associated with processing system 4a would contain the base address in its list of base addresses 604, and also the separate path group control block $600_i$ containing the processing system ID 610 and the host system ID 612 associated with processing system 4b would contain the base address in its list of base addresses 604.

In one embodiment where the processing system 4a, 4b ... 4n comprises a logical partition, the processing system ID 610 comprises an address of the logical partition assigned by the host 2 architecture, such as the host 2 hardware or firmware to uniquely identify the partition. The host system ID 612 may comprise a world wide name (WWN) identifier of the host 2 that is established in the host 2 hardware or firmware at the time of manufacture. In certain embodiments, software executed by the processing system 4a, 4b ... 4n, such as the operating system 10, may not be able to change the processing system ID 610 and host system ID 612, as this information is configured in host 2 hardware.

Figure 7:
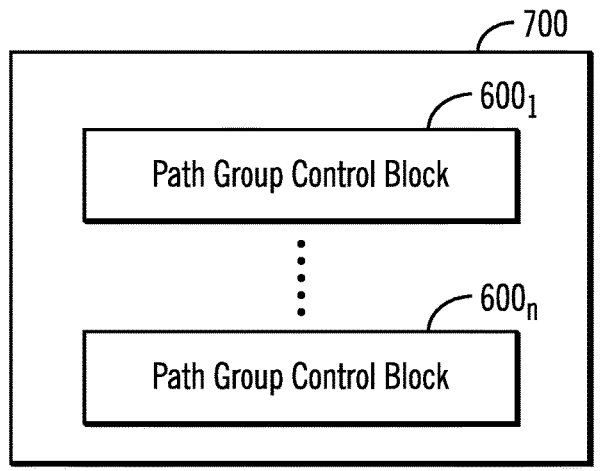
FIG. 7 illustrates an embodiment of an alias-base relationship-authorization information of path group control blocks.

FIG. 7 illustrates an embodiment of an instance of alias-base relationship-authorization information 700 that associates a plurality of path group control blocks $600_1 \ldots 600n$ for one host 2, where all the associated path group control blocks $600_1 \ldots 600_n$ share the same unique path group identifier 602 unique to the host 612 and have LSSs 606 and alias addresses 608 in the path group control blocks $600_1 \ldots 600_n$ assigned from one alias management group 500. The associated path group control blocks $600_1 \ldots 600_n$ have other similar information, such as path information in the path groups, so that all associated path group control blocks $600_1 \ldots 600_n$ in one instance of alias-base relationship-authorization information 700 have the same connection information. In alias-base relationship-authorization information 700, the alias addresses for any LSS in any of the associated path group control blocks $600_1 \ldots 600_n$ may be used by the host to access any of the base addresses 604 for volumes 34 identified in the path group control blocks $600_1 \ldots 600_n$.

In certain implementations, the alias-base relationship-authorization information 700 may be implemented as an internal structure in the control unit 6 that operates as a look-up table to allow the control unit 6 to quickly determines if the host is authorized to use the alias address to issue an I/O request to the specified base address. In this way, the alias-base relationship-authorization information 700 can be used to validate base and alias addresses presented in I/O requests, which is validated by determining that the base address, alias address, path group identifier, etc. of the I/O request are all indicated in the alias-base relationship-authorization information 700.

Figure 8:
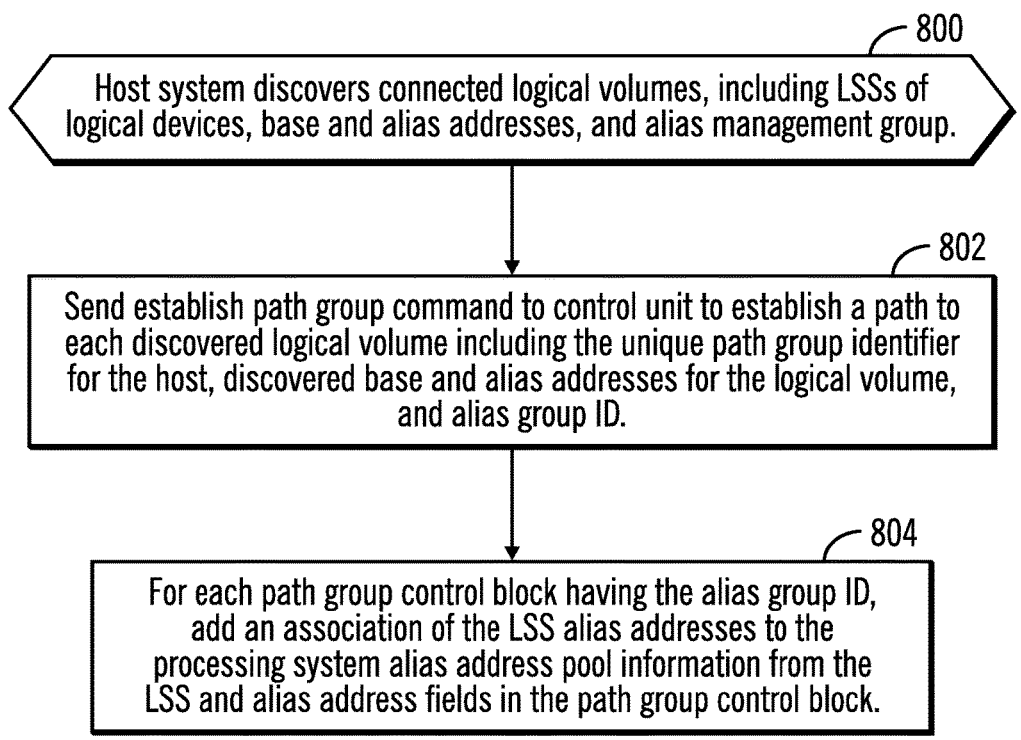
FIG. 8 illustrates an embodiment of operations of a host to associate logical devices with alias addresses.

FIG. 8 illustrates an embodiment of operations performed by a processing system 4a, 4b . . . 4n operating system 10 to discover attached devices. Upon initiating (at block 800) discovery, the operating system 10 discovers (at block 800) information on connected logical volumes, including the logical subsystem 36 in which the logical volume 34 is configured, and the base and alias addresses for the logical volume, and the alias management group 500 in which the logical subsystem is included. The operating system 10 sends (at block 802) an establish path group command to the control unit 6 to establish a path to each discovered logical volume including the unique path group identifier for the host, discovered base and alias addresses for the logical device, and alias group ID. For each established path group control block $600_i$ having the alias group ID 607, the operating system 10 adds (at block 804) an association of the LSS alias addresses to the processing system alias address pool information $400_i$ from the LSS 606 and alias address 608 fields in the path group control block $600_i$. In this way, alias pool address information 400 for a processing system 4a, 4b . . . 4n is populated with alias addresses for logical devices that may be shared to access the logical devices.

Figure 9:
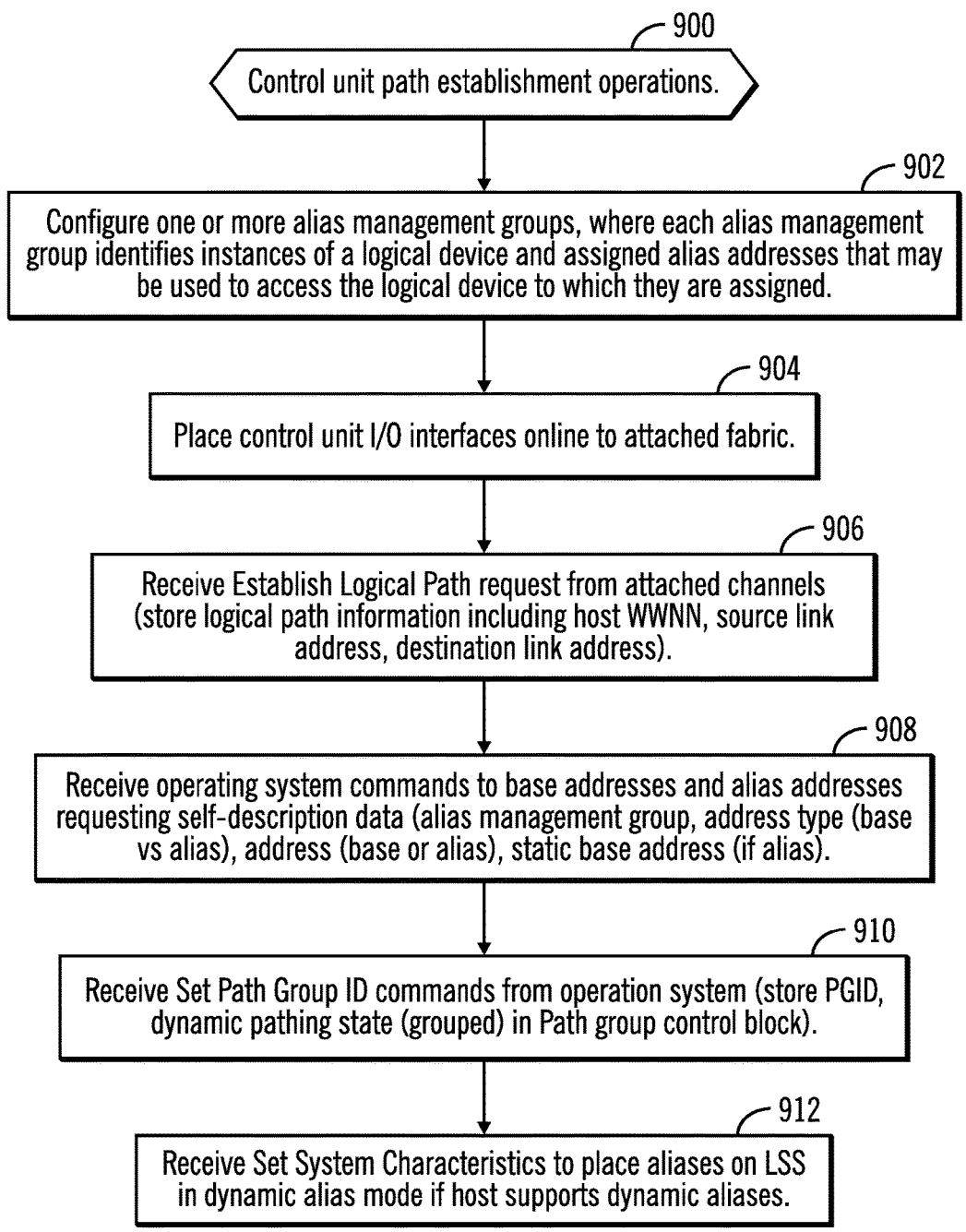
FIG. 9 illustrates an embodiment of operations of a control unit to receive and process host establish path requests.

FIG. 9 illustrates an embodiment of operations performed by the control unit 6 I/O manager 26 to initialize assignments of alias address for hosts 2 to use and establish paths. The operations of FIG. 9 may be performed in response to configuration commands from the operating system 10 in one of the processing systems 4a, 4b . . . 4n in one of the hosts 2. The I/O manager 26 configures (at block 902) one or more alias management groups 500, where each alias management group 500 identifies multiple instances of logical subsystem (LSS) 502 in the alias management group. The alias management group 500 association allows any of the alias addresses assigned to any of the logical subsystems 36 in the alias management group 500 to be used to access any of the logical volumes 34 assigned to any of the logical subsystems 36 in the alias management group 500.

At 904, the control unit places I/O interfaces online to the attached fabric. The fabric alerts attached units that the I/O ports on the control have come online.

At 906, attached channel subsystems that are configured to communicate with this control unit send establish logical path requests to the control unit I/O ports associated with the logical paths configured in its associated subchannels. The protocols for the establish logical path request exchange the world wide node identifiers (WWNN) of the attached units (host and control unit) and the fabric/link addresses of the I/O ports at each end. The control saves this information for each established logical path.

At 908, once the logical paths are established for a subchannel, the channel subsystem puts the subchannel online to the operating system and it issues commands requesting self-description data from the associated device. The control unit receives these commands at each base address and alias address and provides information for the addressed entity including the alias management group, whether the entity is a base or an alias address, the entity address (base address or alias address), and if an alias address, the base address of the logical volume that it has a static alias relationship with. The operating system stores the appropriate information in the UCB for each subchannel and populates the alias address pool information accordingly.

At 910, for each online subchannel, if the associated device is to be online to the operating system, it issues a Set Path Group ID (SPID) command to each logical path of the subchannel and the command is passed to the associated base address or alias address on the specified logical path. The command provides the operating systems path group ID (PGID) and the dynamic pathing state (grouped or ungrouped) to the device. The control unit correlates a matching path group ID on different logical paths to identify all the logical paths of a path group on the device and stores this information in a path group control block (PGCB). It also correlates each path group's information with the other path group's to build the alias-base relationship-authorization information 700.

At 912, if there is an alias on an LSS and the operating system supports dynamic alias mode of operation, the operating system issues a Set System Characteristics command to one of the devices on the logical subsystem causing all aliases on that logical subsystem to operate in dynamic alias mode with this host.

The unique path group ID 602 unique to the processing system 4a, 4b . . . 4n associates all the path group control blocks $600_1 \ldots 600_n$ as alias-base relationship-authorization information 700, where each path group control block $600_1 \ldots 600_n$ in the alias-base relationship-authorization information 700 is associated with a different LSS 606 and all LSSs 606 associated with the path groups in alias-base relationship-authorization information are in one alias management group $500_i$. The I/O manager 26 may generate alias-base relationship information 700 for each unique combination of host PGID, alias management group, and logical path set in the path group.

Figure 10:
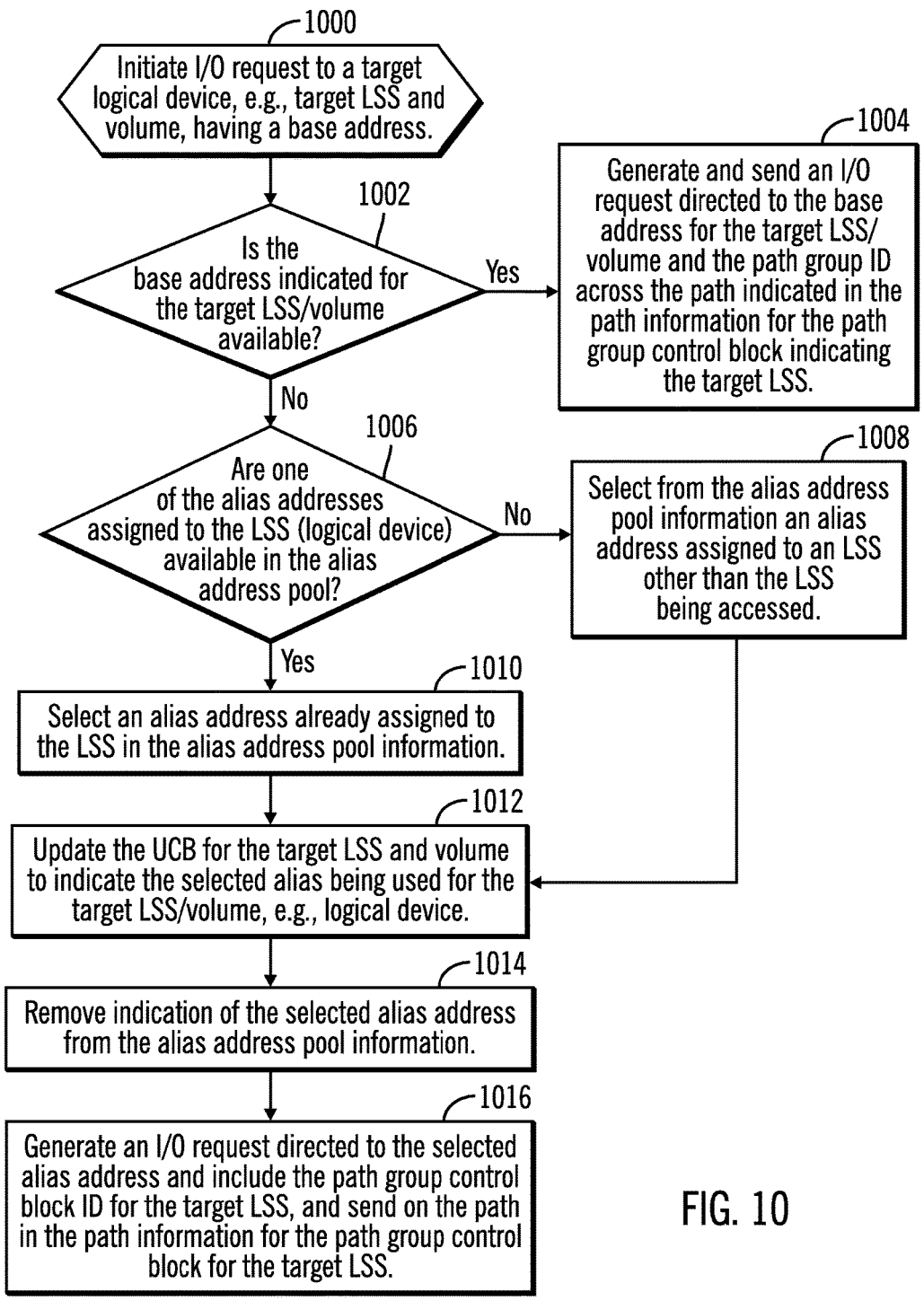
FIG. 10 illustrates an embodiment of operations of a host to generate an Input/Output (I/O) request using an alias address.

FIG. 10 illustrates an embodiment of operations performed by the operating system 10 in one of the processing systems 4a, 4b . . . 4n to initiate an I/O request to a logical volume. If (at block 1002) the base address indicated for the target LSS and volume is available, then an I/O request is generated (at block 1004) that is directed to the subchannel associated with the base address for the target LSS and logical volume, and includes the path group identifier 602 associated with the target LSS with a path group. The I/O request is sent by the channel subsystem 8 over one of the logical paths configured in the subchannel for the logical device.

If (at block 1002) the base address for the target LSS and volume are not available, then a determination is made (at block 1006) whether one of the alias addresses $404_i$ assigned to the target LSS $402_i$ is available in the alias address pool 400. If there is no available alias address $404_i$ for the target LSS $402_i$ in the alias address pool 400, then the operating system 10 selects (at block 1008) from the alias address pool information 400 an alias address $404_j$ assigned to an LSS $402_j$ other than the target LSS being accessed. If (at block 1006) there is an alias address assigned to the target LSS $402_i$ that is available, then the available alias address already assigned to the target LSS $402_i$ is selected from the alias address pool 400 to use. The UCB $202_i$ for the target LSS 206 and volume 208 is updated (at block 1012) to indicate the selected alias address $216_i$ and the LSS $218_i$, to which it is assigned, being used for the target LSS 206/volume 208. Indication of the selected alias address is removed (at block 1014) from the alias address pool 400, so it is no longer available for allocation to a LSS. The operating system 10 generates (at block 1016) an I/O request directed to the selected alias address and includes the path group control block ID for the target LSS. The operating system 10 sends the I/O request to the subchannel associated with the alias address and the channel subsystem sends the I/O request through one of the logical paths configured in the subchannel for the alias address. The I/O request is directed to the selected alias address, and an I/O prefix command may indicate the base address 212 of the target LSS 206/logical volume 208, the selected alias address and the LSS of the selected alias address, which may differ from the target LSS of the I/O request.

Figure 11:
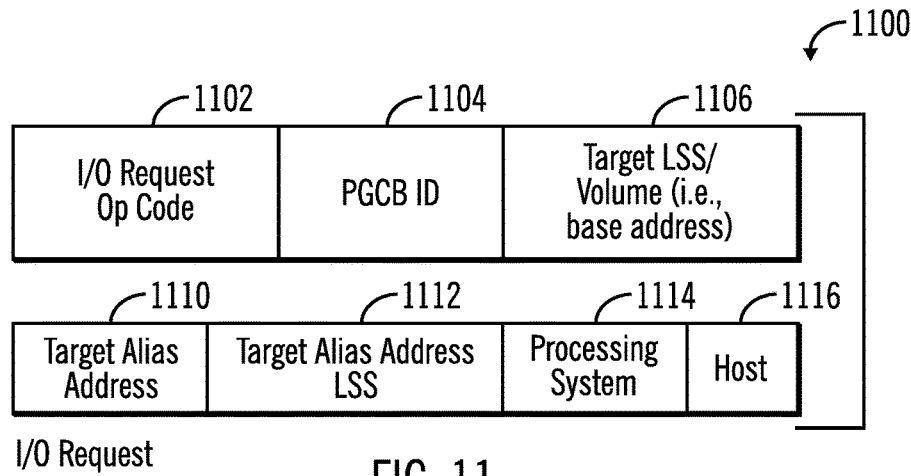
FIG. 11 illustrates an embodiment of an I/O request to a target alias address.

FIG. 11 illustrates an embodiment of an I/O request 1100 generated by a host processing operating system 10 according to the operations of FIG. 10 using an alias address. The information in the I/O request is maintained by the control unit 6 for an I/O operation in progress. The I/O request 1100 includes an I/O request operating code 1102; a path group control block ID 1104 of the path group control block used for sending the request; a target LSS/volume 1106 to which the I/O request is directed, which comprises the base address; the target alias address 1110 used for the I/O request due to the base address 1108 being unavailable; and the target alias address LSS 1112 to which the target alias address 1110 is assigned, which may be different from the target LSS 1106 if there were no alias addresses available for the target LSS 1106 in the processing system alias address pool information 400; the processing system 1114 that initiated the request; and the host 1116 including the processing system 1114. Other information may be included, such as the path information used for the request. In certain embodiments, the I/O request includes the target alias address 1110, and some or all of the other information of the I/O request 1100 may be provided in a prefix command prefixed to the I/O request sent by the operating system 10.

Figure 12:
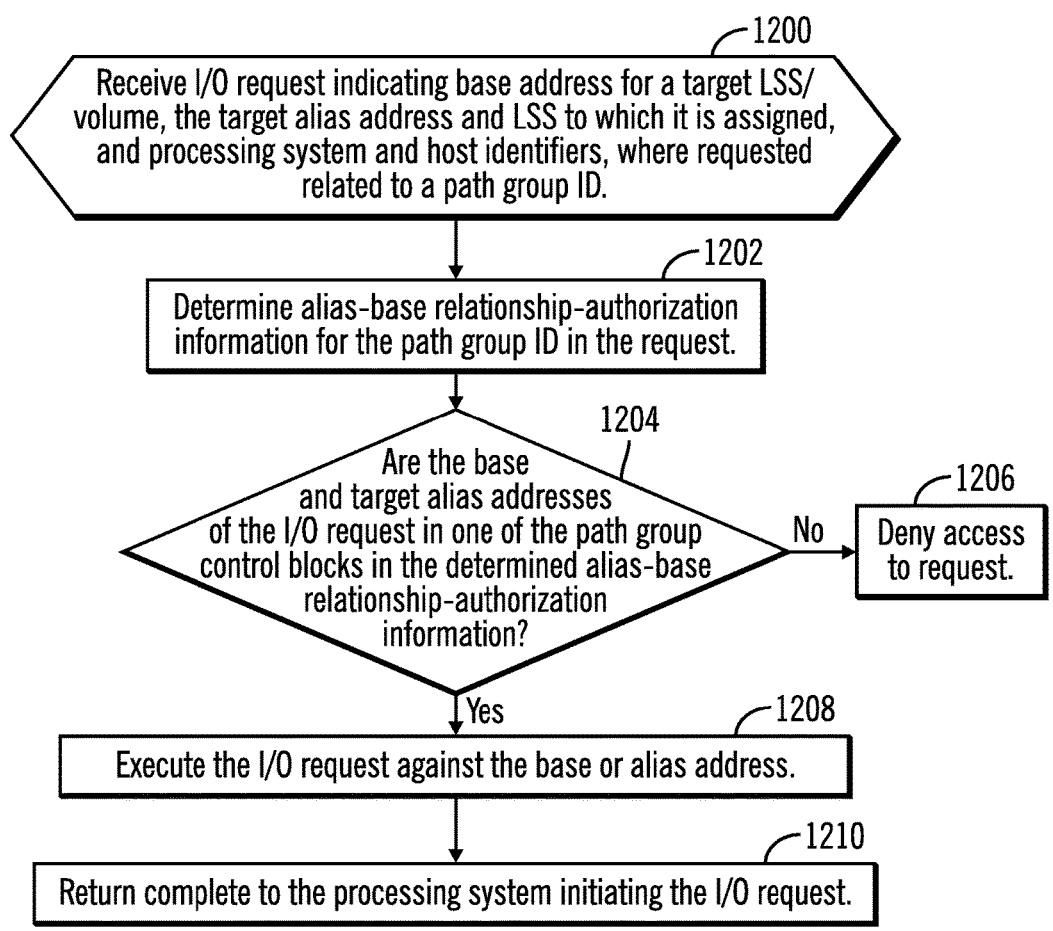
FIG. 12 illustrates an embodiment of operations of a control unit to process an I/O request to a target alias address.

FIG. 12 illustrates an embodiment of operations for the control unit I/O manager 26 to process an I/O request 1100 issued to a dynamic alias. Upon receiving (at block 1200) the I/O request 1100, the I/O manager 26 determines (at block 1202) alias-base relationship-authorization information 700 for the PCGB ID 1104 in the request and determines (at block 1204) whether the requested base address 1108 and target alias address 1110 for the target alias address LSS 1112, and the processing system 1114 and host 1116 indicated in the I/O request 1100, are indicated in the corresponding fields 604, 606, 608, 610, 612 in one or more path group control blocks in the determined alias-base relationship-authorization information 700 having the PCGB ID as a unique path group identifier. If the request is not verified (at block 1204), i.e., the requesting host 1116/processing 1114 system does not have access to the requested target alias address 1110, then the request is denied (at block 1206). Otherwise, if (at block 1204) the request is authenticated through the path group control block information, then the I/O manager 26 executes (at block 1208) the I/O request 1100 against the target LSS 1106/volume 1108 through the target alias address 1110. Complete is then returned (at block 1210) to the requesting processing system 1114. Other messages may be returned, such as deny request from block 1206 or error codes related to processing the I/O request at block 1208.

Figure 13:
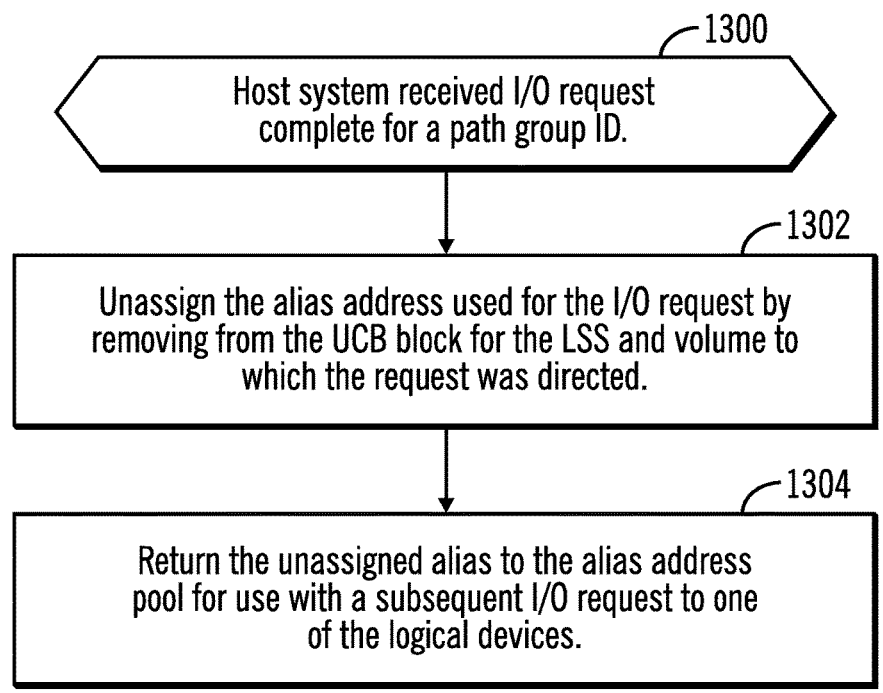
FIG. 13 illustrates an embodiment of operations of a host to process an I/O request complete from the control unit.

FIG. 13 illustrates an embodiment of operations performed by the operating system 10 of the processing system 4a, 4b ... 4n initiating the I/O request 11100 upon receiving (at block 1300) an I/O request complete message for an alias address. The operating system 10 unassigns (at block 1302) the target alias address used for the I/O request by removing the alias address $216_i$ information for the target alias address from the UCB block $202_i$ for the target LSS 206 and volume 208 to which the request was directed. The unassigned alias address is returned (at block 1304) to the alias address pool 400 for use with a subsequent I/O request to one of the logical v, such as by adding indication of the unassigned alias address in the available alias addresses $404_i$ for the LSS $402_i$ for which the alias address was obtained, which can be the LSS of the target logical volume or the LSS for another volume.

Certain embodiments were described with respect to a host using alias addresses to access logical volumes provisioned with capacity from storage devices managed by a control unit. In further embodiments, the alias addresses may be used to access logical devices other than logical volumes, such as storage devices, applications, databases, machines, etc., accessible through a control unit.

Described embodiments provide techniques to share alias address from different logical devices, such as LSSs, for use with all the logical devices by providing associations of logical devices and their available and assigned alias addresses. In this way, alias addresses may be more efficiently used because alias addresses assigned to infrequently accessed logical devices, e.g., logical volumes, are available for use for requests to other more frequently accessed logical devices. A logical device comprises a host address device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
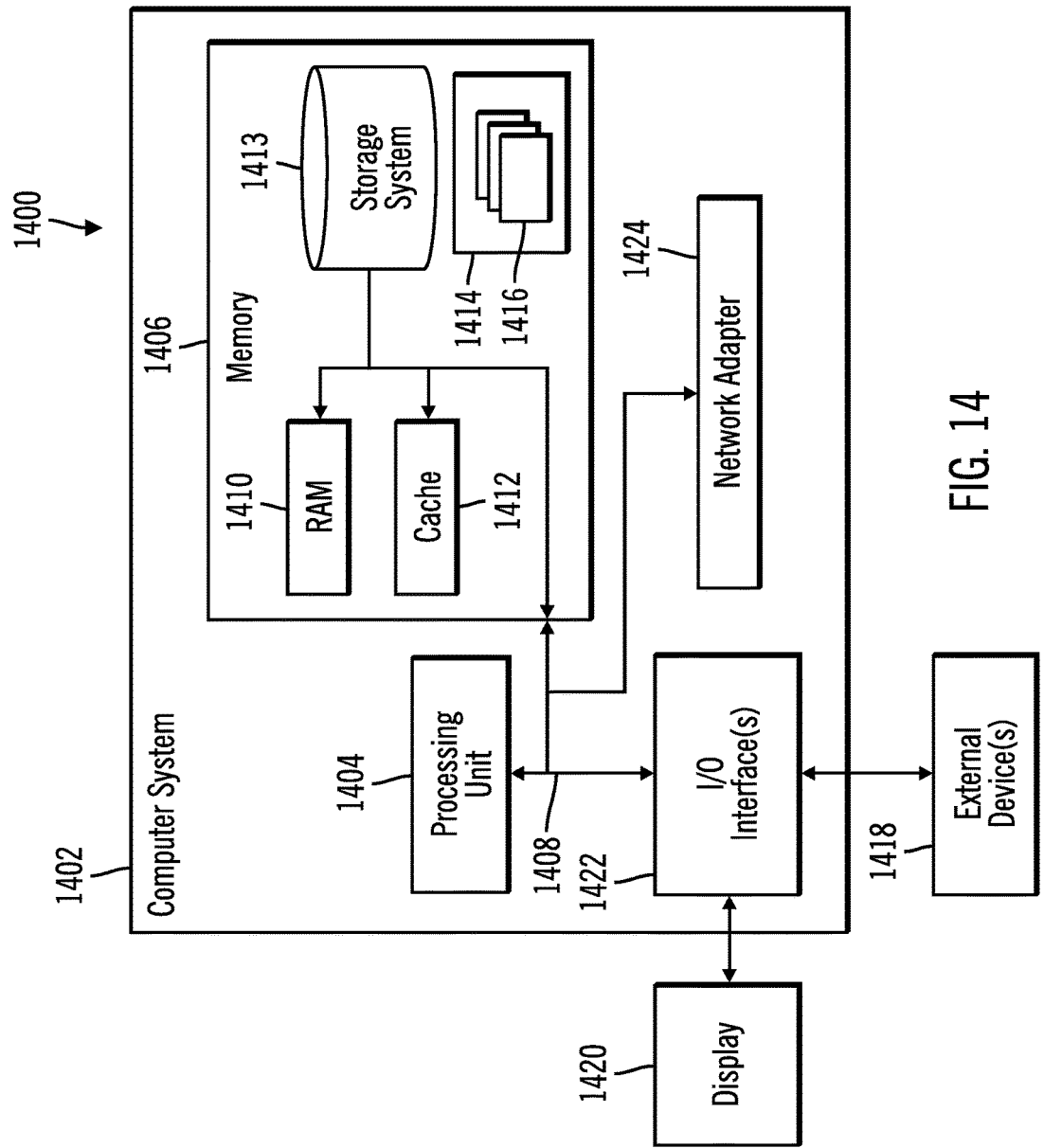
FIG. 14 illustrates a computing environment in which the components of FIG. 1 may be implemented.

The computational components of FIG. 1, including the hosts 2 and control unit 10 may be implemented in one or more computer systems, such as the computer system 902 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product deployed in a control unit managing access by hosts to logical devices configured with capacity from attached physical devices, the computer program product comprising a computer readable storage medium having computer readable program code embodied therein that when executed performs operations, the operations comprising:
configuring an alias management group of logical devices and alias addresses assigned to the logical devices for use to access the logical devices;

receiving from a host a plurality of requests to establish an association of the host with a logical device and the alias addresses assigned to the logical devices in the alias management group; and acknowledging to the host that the association is established in response to determining that the host is assigned the logical devices and alias addresses of the logical devices in the alias management group, wherein the host can use one available alias address assigned to any one of the logical devices indicated in the association to access any one of the logical devices indicated in the association.

2. The computer program product of claim 1, wherein the operations further comprise:

providing self-description information in response to queries from the host that associate a set of logical device with a set of alias addresses in an alias management group.

3. The computer program product of claim 1, wherein the alias management group consists of a set of logical devices and a set of alias addresses in which two or more hosts have access to one or more alias addresses in common and where two or more hosts have access to a set of logical volumes such that each host shares the common alias addresses to only access logical volumes that they are configured to access.

4. The computer program product of claim 3 wherein the operations further comprise:

checking, during a host access to a logical volume through an alias address, whether to allow host access if the host has authority to access the logical volume as determined by verifying that the association established by the host and channel with an alias volume has matching credentials in an association for this host with a base address of the logical volume.

5. The computer program product of claim 1, wherein the logical devices comprise logical volumes, and physical devices in which the logical devices are provisioned with capacity comprise storage devices managed by the control unit.

6. The computer program product of claim 1, wherein a set of the logical devices and alias addresses are grouped to form a logical subsystem, and wherein a set of logical subsystems are grouped to form the alias management group.

7. The computer program product of claim 1, wherein the requests from the host to establish an association with a logical volume or alias address comprise path group establish requests, wherein each path group establish request is to establish a path group including a unique path group identifier unique to the host for which the path group is provided, wherein each of the path groups is associated with one of the logical devices or alias addresses used to access the logical device from the alias management group, and wherein different path groups with a same unique path group identifier are used to determine that the host has access to both the logical devices and the alias addresses.

8. The computer program product of claim 7, wherein path groups are used as a mechanism to determine a subset of alias addresses and logical volumes within an alias management group for which the host has authority to issue an I/O request through any alias of the subset to any logical volume of the subset.

9. The computer program product of claim 7, wherein the alias addresses indicated for the logical devices indicated in the path groups having the unique path group identifier for one of the hosts includes a subset of the alias addresses for a subset of the logical devices indicated in the alias management group.

10. A system for managing access by hosts to logical devices configured with capacity from attached physical devices, comprising:

a processor; and a computer readable storage medium having computer readable program code embodied therein that when executed performs operations, the operations comprising:

configuring an alias management group of logical devices and alias addresses assigned to the logical devices for use to access the logical devices;

receiving from a host a plurality of requests to establish an association of the host with a logical device and the alias addresses assigned to the logical devices in the alias management group; and acknowledging to the host that the association is established in response to determining that the host is assigned the logical devices and alias addresses of the logical devices in the alias management group, wherein the host can use one available alias address assigned to any one of the logical devices indicated in the association to access any one of the logical devices indicated in the association.

11. The system of claim 10, wherein the alias management group consists of a set of logical devices and a set of alias addresses in which two or more hosts have access to one or more alias addresses in common and where two or more hosts have access to a set of logical volumes such that each host shares the common alias addresses to only access logical volumes that they are configured to access.

12. The system of claim 11 where in the operations further comprise:

checking, during a host access to a logical volume through an alias address, whether to allow host access if the host has authority to access the logical volume as determined by verifying that the association established by the host and channel with an alias volume has matching credentials in an association for this host with a base address of the logical volume.

13. The system of claim 10, wherein the logical devices comprise logical volumes, and physical devices in which the logical devices are provisioned with capacity comprise storage devices managed by the system.

14. The system of claim 10, wherein a set of the logical devices and alias addresses are grouped to form a logical subsystem, and wherein a set of logical subsystems are grouped to form the alias management group.

15. The system of claim 10, wherein the requests from the host to establish an association with a logical volume or alias address comprise path group establish requests, wherein each path group establish request is to establish a path group including a unique path group identifier unique to the host for which the path group is provided, wherein each of the path groups is associated with one of the logical devices or alias addresses used to access the logical device from the alias management group, and wherein different path groups with a same unique path group identifier are used to determine that the host has access to both the logical devices and the alias addresses.

16. The system of claim 15, wherein path groups are used as a mechanism to determine a subset alias of addresses and logical volumes within an alias management group for which the host has authority to issue an I/O request through any alias of the subset to any logical volume of the subset.

17. The system of claim 16, wherein the alias addresses indicated for the logical devices indicated in the path groups having the unique path group identifier for one of the hosts includes a subset of the alias addresses for a subset of the logical devices indicated in the alias management group.

18. A method for managing access by hosts to logical devices configured with capacity from attached physical devices, comprising:
configure an alias management group of logical devices and alias addresses assigned to the logical devices for use to access the logical devices;
receiving from a host a plurality of requests to establish an association of the host with a logical device and the alias addresses assigned to the logical devices in the alias management group; and
acknowledging to the host that the association is established in response to determining that the host is assigned the logical devices and alias addresses of the logical devices in the alias management group, wherein the host can use one available alias address assigned to any one of the logical devices indicated in the association to access any one of the logical devices indicated in the association.

19. The method of claim 18, wherein the alias management group consists of a set of logical devices and a set of alias addresses in which two or more hosts have access to one or more alias addresses in common and where two or more hosts have access to a set of logical volumes such that each host shares the common alias addresses to only access logical volumes that they are configured to access.

20. The method of claim 19, further comprising:
checking, during a host access to a logical volume through an alias address, whether to allow host access if the host has authority to access the logical volume as determined by verifying that the association established by the host and channel with an alias volume has matching credentials in an association for this host with a base address of the logical volume.

21. The method of claim 18, wherein the logical devices comprise logical volumes, and physical devices in which the logical devices are provisioned with capacity comprise storage devices managed by a control unit.

22. The method of claim 18, wherein a set of the logical devices and alias addresses are grouped to form a logical subsystem, and wherein a set of logical subsystems are grouped to form the alias management group.

23. The method of claim 18, wherein the requests from the host to establish an association with a logical volume or alias address comprise path group establish requests, wherein each path group establish request is to establish a path group including a unique path group identifier unique to the host for which the path group is provided, wherein each of the path groups is associated with one of the logical devices or alias addresses used to access the logical device from the alias management group, and wherein different path groups with a same unique path group identifier are used to determine that the host has access to both the logical devices and the alias addresses.

24. The method of claim 23, wherein path groups are used as a mechanism to determine a subset of alias addresses and logical volumes within an alias management group for which the host has authority to issue an I/O request through any alias of the subset to any logical volume of the subset.

25. The method of claim 24, wherein the alias addresses indicated for the logical devices indicated in the path groups having the unique path group identifier for one of the hosts includes a subset of the alias addresses for a subset of the logical devices indicated in the alias management group.

* * * * *